(12) United States Patent
Perri et al.

(10) Patent No.: US 11,342,949 B2
(45) Date of Patent: May 24, 2022

(54) TRANSMISSION SYSTEM FOR A BODY-WORN ELECTRONIC DEVICE

(71) Applicant: Sonova AG, Stäfa (CH)

(72) Inventors: Antonio Perri, Portalban (CH); Yves Oesch, Neuchâtel (CH); Francois Callias, Fontaines (CH)

(73) Assignee: SONOVA AG, Stäfa (CH)

( * ) Notice: Subject to any disclaimer, the term of this patent is extended or adjusted under 35 U.S.C. 154(b) by 0 days.

(21) Appl. No.: 17/253,754

(22) PCT Filed: Jun. 25, 2018

(86) PCT No.: PCT/EP2018/066964
§ 371 (c)(1),
(2) Date: Dec. 18, 2020

(87) PCT Pub. No.: WO2020/001732
PCT Pub. Date: Jan. 2, 2020

(65) Prior Publication Data
US 2021/0266019 A1 Aug. 26, 2021

(51) Int. Cl.
*H04B 1/034* (2006.01)
*H01Q 1/27* (2006.01)
*H01Q 7/00* (2006.01)
*H04R 25/00* (2006.01)

(52) U.S. Cl.
CPC .......... *H04B 1/0343* (2013.01); *H01Q 1/273* (2013.01); *H01Q 7/00* (2013.01); *H04R 25/554* (2013.01); *H04R 25/552* (2013.01); *H04R 25/602* (2013.01); *H04R 25/604* (2013.01); *H04R 25/609* (2019.05); *H04R 2225/025* (2013.01); *H04R 2225/51* (2013.01)

(58) Field of Classification Search
CPC ........ H04B 1/0343; H01Q 1/273; H01Q 7/00; H04R 25/554; H04R 25/609; H04R 25/552; H04R 25/602; H04R 25/604; H04R 2225/025; H04R 2225/51
See application file for complete search history.

(56) References Cited

U.S. PATENT DOCUMENTS

| | | |
|---|---|---|
| 6,597,318 B1 | 7/2003 | Parsche et al. |
| 2003/0034929 A1* | 2/2003 | Bolzer .................... H01Q 3/24 343/770 |
| 2013/0249753 A1 | 9/2013 | Asanuma et al. |

(Continued)

OTHER PUBLICATIONS

International Search Report issued in Application No. PCT/EP2018/066964 dated Mar. 29, 2019.

(Continued)

*Primary Examiner* — Nguyen T Vo
(74) *Attorney, Agent, or Firm* — Pearne & Gordon LLP

(57) ABSTRACT

A body-worn electronic device, including a loop antenna and a transmitter. The overall physical length of the loop antenna is less than 75% of the vacuum wavelength of a lower limit frequency of the operating frequency range of the transmitter, while the electrical length of the antenna is from 0.9 to 1.1 times the guided wavelength of the lower limit frequency of the operating frequency range of the transmitter. The loop antenna includes a plurality of conductors which are connected in series by inductors so as to increase the electrical length of the loop antenna.

36 Claims, 10 Drawing Sheets

(56) References Cited

U.S. PATENT DOCUMENTS

2014/0010394 A1    1/2014  Kvist
2015/0281859 A1   10/2015  Fischer et al.
2016/0360329 A1   12/2016  Thaysen
2020/0358194 A1*  11/2020  Reppel ................... H01Q 5/378

OTHER PUBLICATIONS

Written Opinion issued in Application No. PCT/EP2018/066964 dated Mar. 29, 2019.
Hyun Lee, Dong, et al. : "A Compact and Low-Profile Tunable Loop Antenna Integrated With Inductors", IEEE Antennas and Wireless Propagation Letters, vol. 7, 2008.
Janzen, Gerd: "Kurze Antennen—Entwurf und Berechnung verkürzter Sende- und Empfangsantennen", Franckh'sche Verlagshandlung Stuttgart, 1986, pp. 174-201, ISBN 3 440 05469 1.

* cited by examiner

TRANSMISSION SYSTEM FOR A BODY-WORN ELECTRONIC DEVICE

The disclosure relates to a transmission system for a body-worn electronic device, such as hearing devices like an ITE ("in-the-ear"), an RIC ("receiver-in-the-channel"), a BTE ("behind-the-ear") hearing instrument or a sound processor of a cochlear implant, comprising a loop antenna and a transmitter.

EP 2 285 138 B1 relates to an ITE hearing aid comprising a loop antenna built on a flexible PCB (Printed Circuit Board), which is integrated within the faceplate of the hearing aid in the battery lid.

U.S. Pat. No. 8,494,197 B2 relates to an ITE hearing aid comprising a magnetic loop antenna which is placed around the battery and the microphone and inside a grove of the faceplate, wherein the antenna is formed by a metallic trace built on a flexible PCB for operation in a 900 MHz band.

U.S. Pat. No. 8,565,457 B2 relates to a BTE hearing aid with a magnetic loop antenna formed as a wide metal strip, wherein the antenna plane may be parallel to the skin of the user or may be orthogonal to the skin surface and which encircles the electronic component and part of the earphone.

U.S. Pat. No. 8,699,733 B2 likewise relates to a BTE hearing aid comprising an antenna which has two loops placed on the opposite left and right sides of the BTE device.

US 2014/0010392 A1 relates to different types of antennas for BTE hearing aids for use at 2.4 GHz. According to one example, the main radiating element of the antenna is provided with extension elements placed on the left and right sides of the hearing aid, which may be formed by a single trace, a meander line, a plate or a loop. The antenna produces an electrical field that is orthogonal to the skin of the user.

EP 2 680 366 A1 relates to slot antennas to be used in ITE or BTE hearing aids. In the case of an ITE hearing aid, the antenna is formed by a conductive surface facing the external surface of the shell, wherein a slot is provided in the conductive surface in a serpentine form having a total length of a half wavelength at 2.4 GHz.

U.S. Pat. No. 9,237,405 B2 relates to loop antennas for BTE hearing aids operating at 2.4 GHz, wherein the antenna may be a loop antenna and wherein the length of the loop wire is between ¾ of the wavelength and ⅘ of the wavelength. The wire may be meandered on the side surfaces of the BTE hearing aid in order to achieve the desired length.

"*A Compact and Low-Profile Tunable Loop Antenna Integrated With Inductors*", by Dong Hyun Lee et al., IEEE ANTENNAS AND WIRELESS PROPAGATION LETTERS, VOL. 7, 2008 relates to miniaturized loop antennas comprising two inductors and using a ground plane.

It is mentioned in "*Kurze Antennen—Entwurf und Berechnung verkürzter Sende-und Empfangsantennen*", by Gerd Janzen, Franckh'sche Verlagshandlung Stuttgart; ISBN 3 440 05469 1 that shorter classical monopole or dipole antennas may be obtained by using serial inductors.

It is an objective of the disclosure to provide for a transmission system for body-worn electronic devices, which is relatively small in size, but nevertheless allows to achieve a radiation pattern which is suitable for efficient wireless transmission, for example at the head of a user of the electronic device.

According to the present disclosure, this objective is achieved by a transmission system as defined in claims 1 and 4, respectively.

According to one aspect of the present disclosure, the loop antenna is provided with an overall physical length of less than 75% of the vacuum wavelength at to the operation frequency, while the electrical length of the antenna is increased by connecting the conductors of the antenna in series by inductors so that the electrical length of the antenna is close to the guided wavelength at the operating frequency. Thereby a relatively small size of the antenna can be achieved, while nevertheless the antenna may operate as a "full-wave" loop antenna, thereby enabling a radiation pattern, which is particularly suitable for efficient transmission at the user's body. For example, a full-wave loop antenna allows for a radiation pattern having maxima which are oriented toward the front (nose) and the back (neck) of the user when the electronic device comprising the antenna is worn in or at the ear of the user. Such radiation pattern, wherein the electric field component is orthogonal to the head, is very efficient for binaural propagation around the user's head.

A further contribution to the increase of the electrical length can be obtained by increasing the permittivity in the space around the antenna. This can be achieved by providing a frame structure around the conductors, which has a relative permittivity at the operating frequency of at least 2. In some implementations, the frame structure has a permittivity at the operating frequency of at least 5. In some implementations, the frame structure may comprise a support structure for carrying the conductors (for example, this support structure may be the faceplate of an ITE hearing instrument), an adhesive material for gluing the conductors to the support structure and a hard frame for covering the side of the conductors facing away from the support structure.

In some implementations, the operating frequency of the transmitter is in the 2.4 GHz Industrial, Scientific and Medical ("ISM") band.

According to another aspect of the present disclosure, the overall physical length of the antenna is less than 35% of the vacuum wavelength at the lower limit of the operating frequency range of the transmitter, while the electrical length of the antenna is close to half of the guided wavelength at the lower limit of the operating frequency range of the transmitter. The loop antenna comprises a plurality of conductors which, in part, are connected in series by inductors so as to increase the electrical length of the antenna and which, in part, are connected in series by capacitors so as to keep the maximum impedance point away from the feeding point by a distance of about 180 degrees, namely from 160 to 220 degrees. Thereby a radiation pattern can be obtained which is very efficient for binaural propagation around the user's head and for off-body range performances.

Some embodiments are defined in the dependent claims.

Examples of the disclosure are illustrated by reference to the drawings, wherein.

Figure 1A:
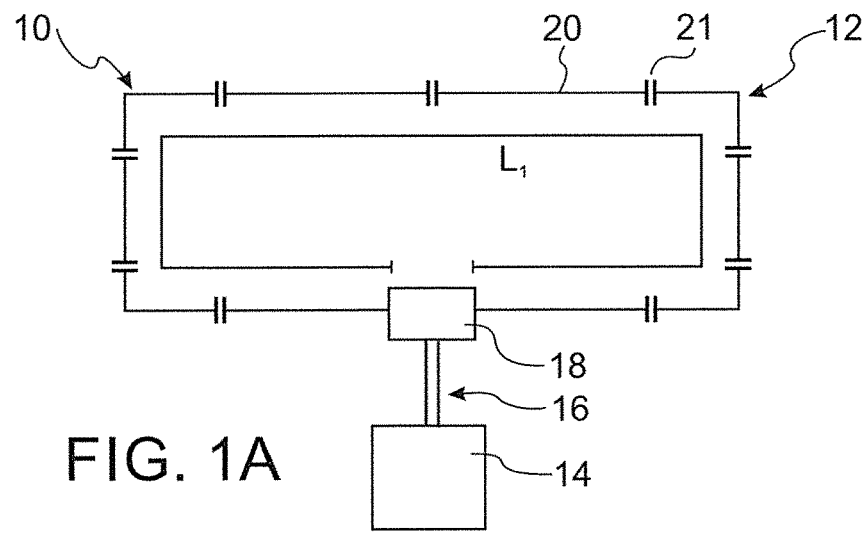
FIG. 1A is a block diagram of an example of a magnetic loop antenna connected to a transmitter.

The drawings have not necessarily been drawn to scale. Similarly, some components and/or operations may be separated into different blocks or combined into a single block for the purposes of discussion of some of the embodiments of the disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

It is to be understood that "transmitter" or "transmission system," as used herein is not restricted to transmission-only functionality but also may include receiver or transceiver functionality.

The "electrical length" of a loop antenna at a given frequency is the length of the antenna in terms of the phase shift introduced by transmission over the antenna at that frequency. It may be expressed as N wavelengths at that frequency (or as the phase expressed in degrees or radians). The "physical length" of a loop antenna is the total length of the conductors forming the antenna.

An electrical antenna length of "around one wavelength" or "close to one wavelength" (corresponding to the lower limit of the operating frequency of the transmitter) is to be understood to range from 0.9 to 1.1 times the guided wavelength at the lower limit of the operating frequency of the transmitter. Similarly, an electrical antenna length of "around half of one wavelength" or "close to half of one wavelength" is to be understood to range from 0.45 to 0.55 times one wavelength. The "guided wavelength" relates to the apparent wavelength in the material forming the antenna; in term of phase shift, the "guided wavelength" is the distance along the antenna resulting in a phase shift of the signal of $2*\pi$. The "vacuum wavelength" is the wavelength measured in vacuum at the at the lower limit of the operating frequency of the transmitter.

A "magnetic loop antenna" as used herein is a loop antenna which has an electrical length which is much shorter than the wavelength at the operation frequency and which is set in resonance on the operation frequency through serial capacitors.

"Hearing devices" include, for example, all types of hearing assistance devices, such as ITE, RIC or BTE hearing instruments or a sound processor of a cochlear implant.

Figure 1B:
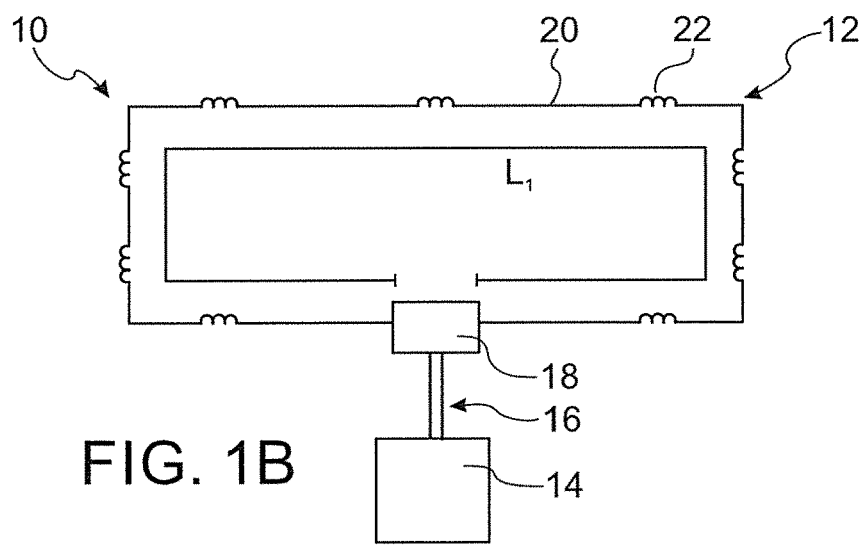
FIG. 1B is a block diagram of an example of a full-wave loop antenna connected to a transmitter.

FIG. 1B is a block diagram of an example of a wireless transmission system 10 for a body-worn electronic device, such as a ITE hearing instrument, RIC hearing instrument, a BTE hearing instrument or a sound processor of a cochlear implant. The transmission system comprises a loop antenna 12, a transmitter 14, a transmission line 16 and a matching circuit 18 for transforming the impedance of the antenna 12 to the impedance of the transmission line 16. The antenna 12 comprises a plurality of conductors 20 which are connected in series by inductors 22 such that adjacent conductors 20 are connected by one of the inductors 22, with conductors 20 and the inductors 22 together forming a closed loop. The overall physical length (indicated at $L_1$ in FIG. 1B) is less than 75% of the vacuum wavelength at the lower limit of the operating frequency range of the transmitter 14, while the electrical length of the antenna 12 is typically around the guided wavelength. In some implementations, the physical length $L_1$ of the antenna 12 is less than 50% of the vacuum wavelength at the operating frequency of the transmitter 14, and in some implementations it is from 20 to 30% of said wavelength.

The antenna 12 is a "full wave" antenna due to its electrical length of around the guided wavelength, while—due to its shorter physical length—it is nevertheless relatively small in size, so that it fits well within small body-worn electronic devices, such as an ITE or RIC hearing instrument.

According to some implementations, the operating frequency of the transmitter 14 is within the 2.4 GHz ISM band, which is from 2.4 GHz to 2.5 GHz.

For example, at 2.4 GHz the wavelength is about 12 cm, whereas a circular loop antenna according to the present disclosure may have, for example, a diameter of 12 mm, resulting in a physical length $L_1$ of about 38 mm, which is about 30% of the vacuum wavelength at 2.4 GHz.

The inductors 22 serve to increase the electrical length of the antenna 12, so that the electrical length of the antenna 12 is significantly larger than the physical length $L_1$.

In some implementations, the antenna 12 may comprise from 1 to 15 of the inductors 22. In some implementations, the inductors 22 may have an inductance in the range of 0.5 to 100 nH. In some implementations, the inductors 22 are chip inductors. It is desirable that the inductors 22 have a relatively high quality factor so as to obtain high transmission efficiency of the antenna. In some implementations, the quality factors of the inductors 22 at the lower limit of the operating frequency range of the transmitter 14 is at least 50; in some implementations it is at least 80.

While in FIG. 1B an example of a rectangular antenna is shown, the shape of the antenna, in some implementations, may be different from rectangular, such as circular, oval or rectangular with rounded corners, etc.

Usually, the impedance of the transmitter 14 is about the same as the impedance $Z_0$ of the transmission line 16, whereas the matching circuit 18 is required for transforming the loop antenna impedance, as seen between the antenna terminals 71 and 72, to the impedance $Z_0$ of the transmission line 16. In some implementations, the matching circuit 18 may be formed by a single inductor (coil); in other implementations it may formed by a capacitor. In most situations it is formed by a combination of inductors and capacitors.

For comparison, in FIG. 1A a block diagram of an example of a "magnetic loop antenna" is shown, which has an electrical length significantly below the guided wavelength at the operating frequency, while the physical length is similar to that of the "full-wave antenna" of FIG. 1B, such as less than 40% of the wavelength in vacuum. Such "electric shortening" is achieved by connecting the conductor portions in series by capacitors 21. In other words, magnetic loop antennas undergo capacitive tuning to achieve the desired resonance frequency.

Figure 3A:
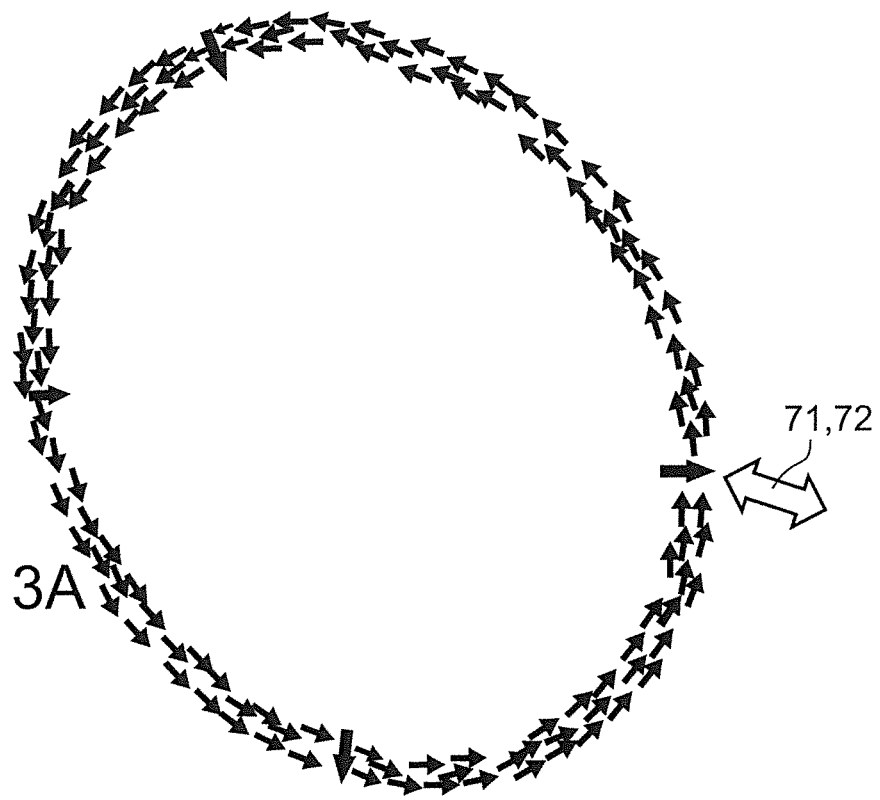
FIGS. 3A to 3C are examples of the current distribution in a circular loop antenna, which is designed as a magnetic loop antenna (FIG. 3A), as a full-wave loop antenna (FIG. 3B) or as a half-wave loop antenna (FIG. 3C) respectively, tuned with series capacitors and/or inductors.
Figure 3B:
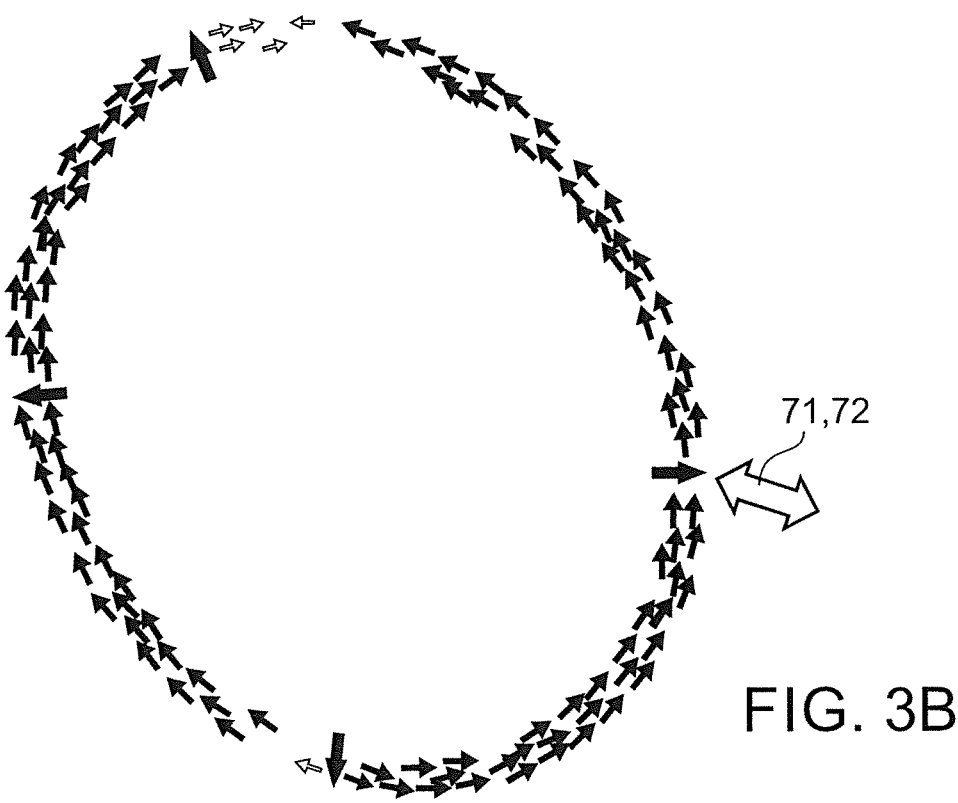
Figure 3C:
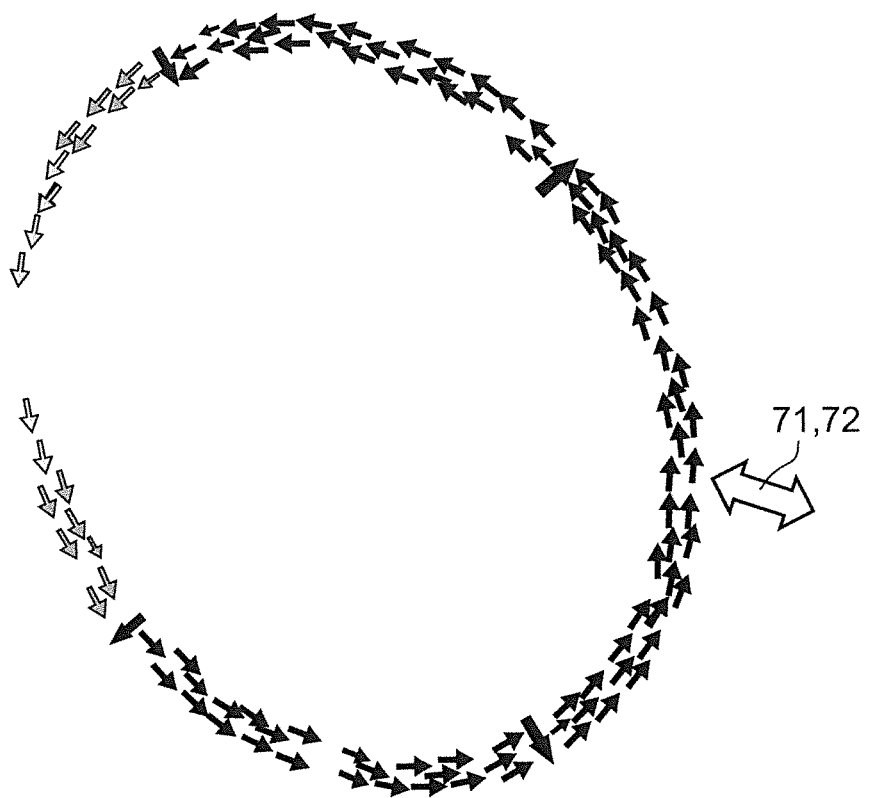
Figure 4:
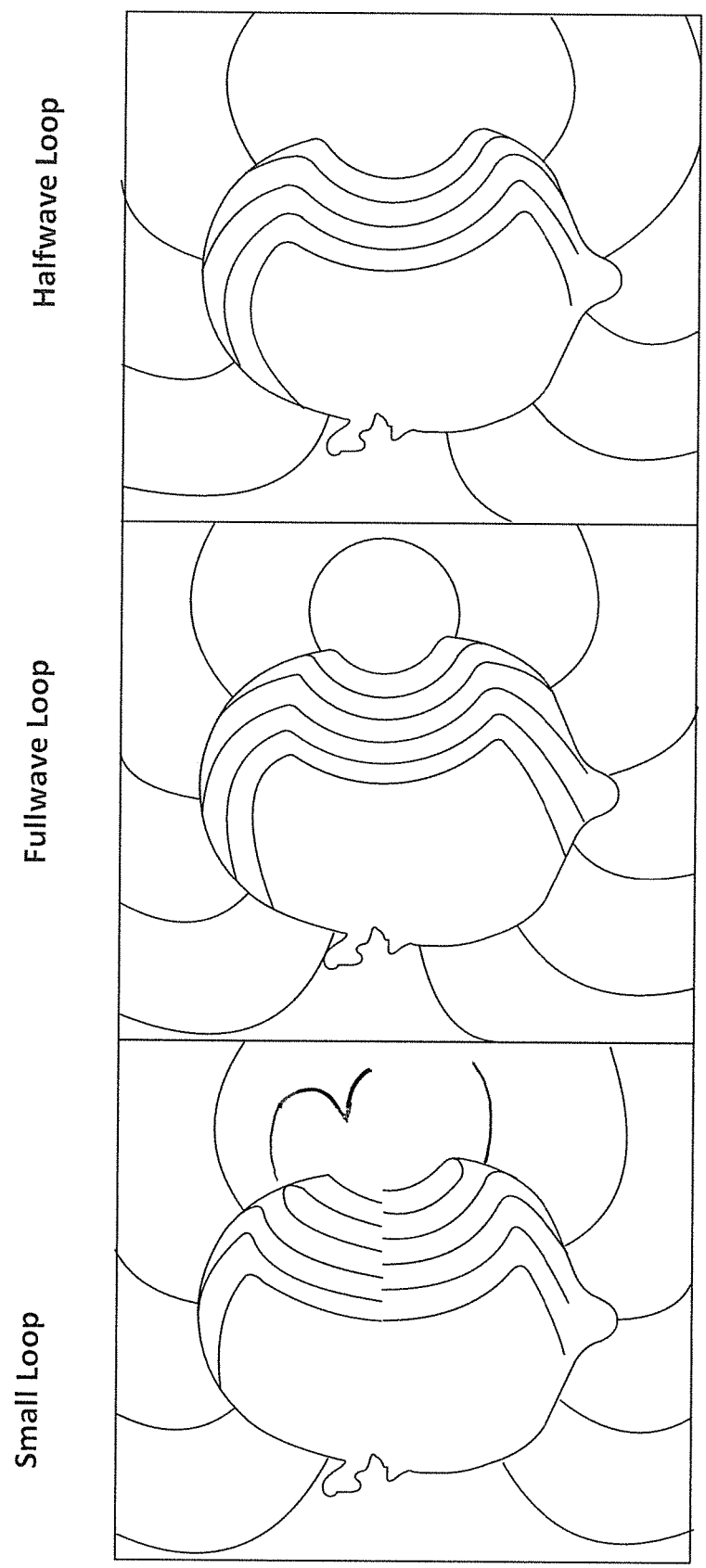
FIG. 4 are examples of the electrical field distribution around the head when antennas of the type with the current distributions shown in FIGS. 3A to 3C are part of an ITE hearing instrument worn in user's left ear (left-hand side and right-hand side, respectively)
Figure 5:
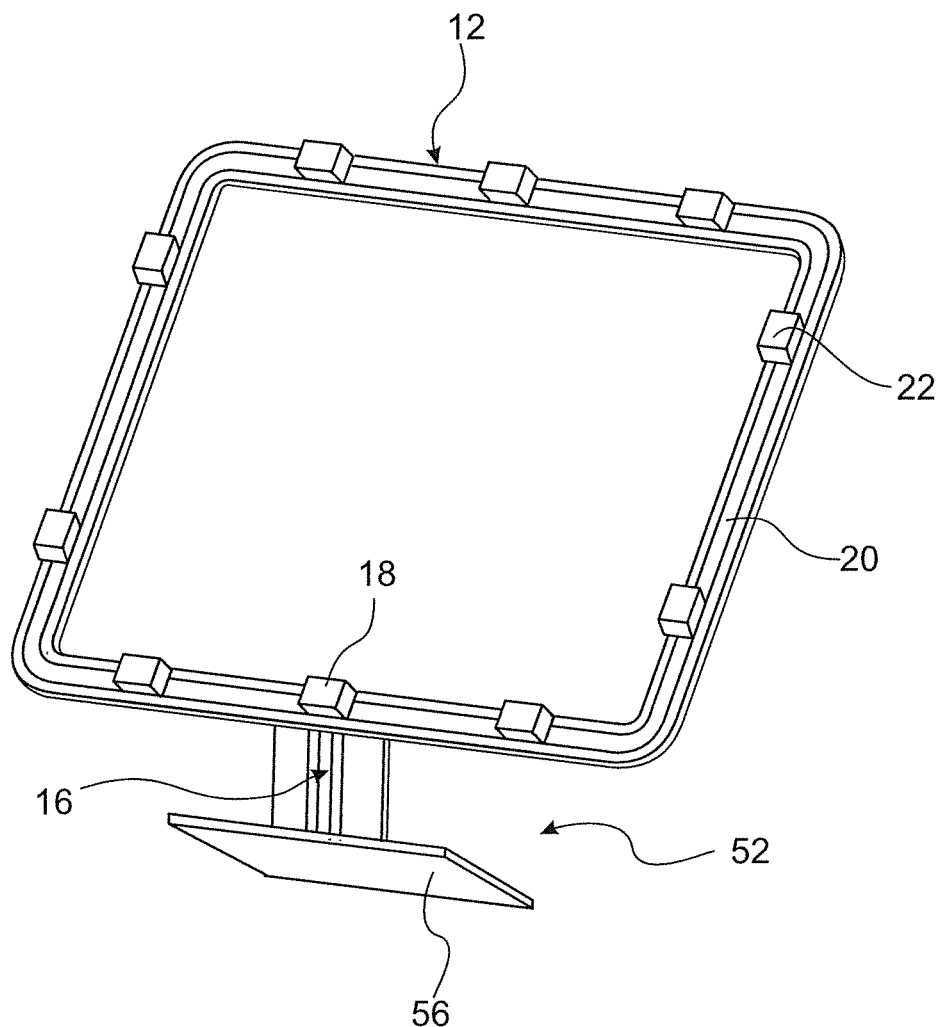
FIG. 5 is a perspective view of an example of a rectangular full-wave loop antenna to be used in an ITE hearing instrument, including the connections to a transmitter.

Benefits of a "full-wave loop antenna" (like in FIG. 1B) versus a "magnetic loop antenna" (like in FIG. 1A) are illustrated in FIGS. 3 to 5. The examples of FIGS. 3 to 5 compare a 12 mm diameter (corresponding to a length of 38 mm) circular loop antenna having an electrical length which is much shorter than the guided wavelength (hereinafter referred to as "magnetic antenna") and an antenna of the same physical length but having an electrical length of one guided wavelength (at 2.4 GHz) (hereinafter referred to as "full-wave loop antenna"). The magnetic antenna uses a plurality of serial capacitors to tune the resonance frequency to the required value. FIGS. 3A and 3B show the current distribution in the antenna at 2.4 GHz for the magnetic loop antenna (FIG. 3A) and the full-wave loop antenna (FIG. 3B), with the feeding point being indicated by arrows 71, 72.

It can be seen in FIG. 3A that the current distribution for the magnetic loop antenna is uniform and goes in the same direction all around the loop; this will generate a magnetic field orthogonal to the loop conductors—and therefore a radiation pattern with a null oriented along the axis of the loop. By contrast, for the full-wave loop antenna, the current distribution in FIG. 3B has two current inversion points, with the current distribution being for half of the length in one direction and for the second half in the opposite direction; maximum current levels are present at the feeding point and at the opposite side of the feeding point. The current distribution is equivalent to one sinusoidal period (half positive, half negative), with nulls distant by 90 degrees from the feeding point 71, 72. Since this structure is very similar to a folded dipole, the radiation pattern is very similar, with the maximum directivity being oriented as vertical axial torus. The radiation pattern "nulls" are then oriented along the axis formed by the two points of current inversion The radiation pattern is orthogonal to that of the magnetic loop since radiation nulls are located where the current nulls are. This allows the antenna to radiate at best in the horizontal plane, if the loop is fed horizontally.

In FIG. 4 an example of the electric field propagation pattern is shown for a magnetic loop antenna (left-hand side) and a full-wave loop antenna (right-hand side) when used in an ITE hearing instrument which is placed inside the ear, with an angle to the sagittal plane within −25° and +35° (FIG. 4 is cut in the horizontal plane of a user's head, with the ITE hearing instrument being placed in the left ear). It can be seen in FIG. 4 that the radiation pattern of the full-wave loop antenna is more suitable for binaural propagation around the user's head (optimal binaural propagation is achieved when the electric field component is orthogonal to the head).

As already mentioned above, a first measure to increase the electrical length of the loop antenna is to provide the antenna with a plurality of inductors which connect in series the conductors of the antenna. A second measure to increase the electrical length is to at least partially surround the conductors by a frame structure of an insulating material having a relatively high permittivity at the operating frequencies of the transmitter, so as to increase the relative dielectric constant in the near-field region of the antenna. The relative permittivity of the frame structure of insulating material around the conductors should be at least 2 to have a significant impact, as averaged over the frame structure. Since the wavelength is proportional to the square root of the dielectric constant of the material in which the signal is traveling, the dielectric constant has an impact on the loop resonance frequency. In particular, the resonance frequency decreases with increasing the thickness of the frame structure of insulating material and increasing the relative permittivity of the frame structure of insulating material, thereby increasing the electrical length of a given conductor geometry.

The two measures for increasing the electrical length of the antenna are complementary, since providing the antenna with a high permittivity surrounding material allows to use smaller inductance values of the serial inductors, resulting in a higher quality factor of the inductors compared to an antenna without a high permittivity surrounding material. Using a high permittivity material for the frame structure also allows to distribute the inductance over the loop so as to set the current inversion points and accordingly steer the radiation pattern. Combining these two measures allows to reduce the size of the antenna so as to fit better inside the body-worn electronic device.

Figure 6:
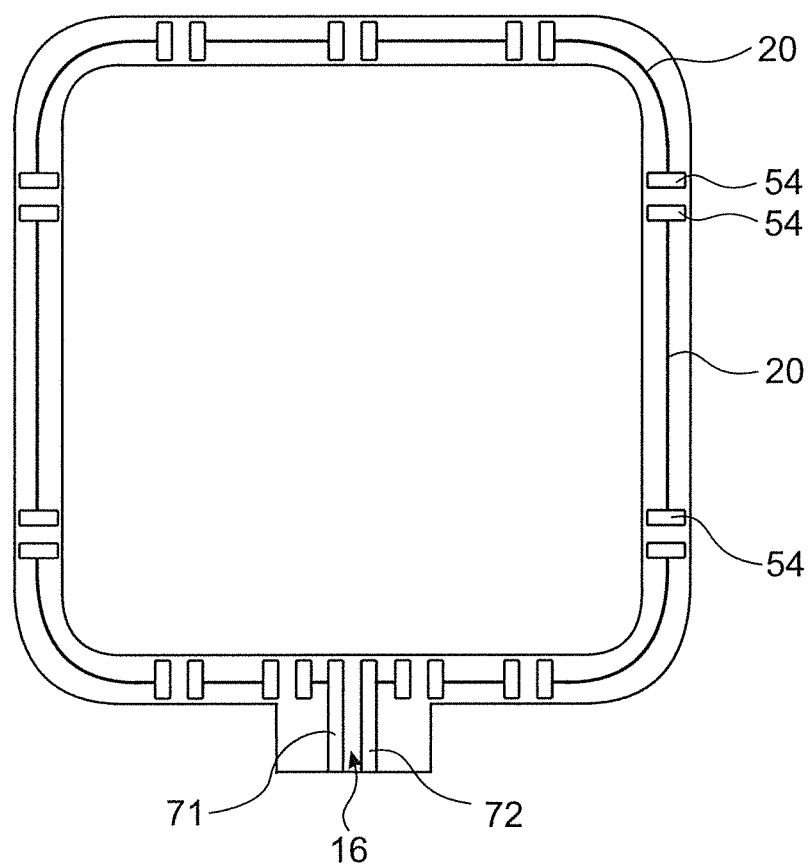
FIG. 6 shows an example of the PCB layout of the full-wave loop antenna of FIG. 5.
Figure 7:
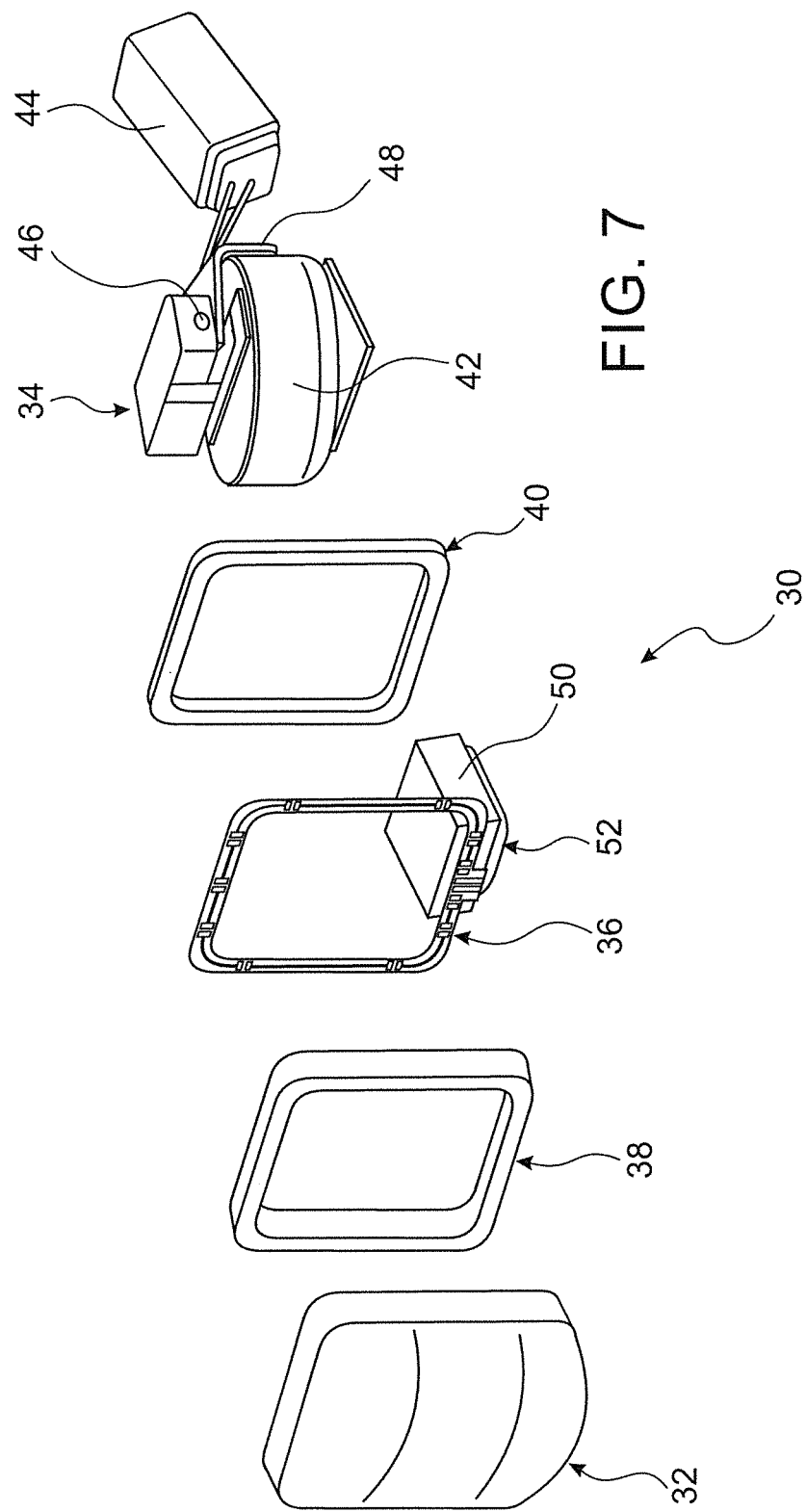
FIG. 7 is an exploded view of an example of an ITE hearing instrument comprising the antenna of FIG. 5.

An example of an ITE hearing instrument 30 comprising a full wave-loop antenna 12 is shown in FIGS. 6 to 10, wherein the ITE hearing instrument 30 comprises a faceplate 32, an audio module 34, an antenna module 36, an adhesive material frame 38 for gluing the antenna module 36 to the faceplate 32, and a hard frame 40 of high permittivity material for covering the side of the antenna module facing away from the faceplate 32 (see FIG. 7).

The audio module 34 comprises a battery 42, a loudspeaker 44, a microphone unit 46 and a flexible PCB structure 48 for electrically and mechanically connecting these components.

The antenna module 36 comprises a signal processing unit 50 and a flexible PCB structure 52. The signal processing unit 50 includes audio signal processing functionality and also acts as a wireless transmitter for the antenna 12.

The flexible PCB structure 52, which is shown in more detail in FIG. 5, comprises a rectangular loop antenna 12 formed by metal traces/tracks, such as copper traces, on a flexible substrate, such as a polyimide, which are connected in series by chip inductors 22, with the metal traces forming the conductors 20 of the antenna 12. The metal traces 20 may have, in some implementations, a width of 0.05 to 0.5 mm and a thickness of 8 to 16 μm. In some implementations, the PCB structure 52 may be a three-layer PCB stack-up comprising three copper layers with two polyimide layers in-between. The total thickness, for example, may be around 200 μm. In the example of FIG. 5, the shunt discrete component 18 acts as the matching circuit. The transmission line 16 is implemented as two metal traces on the PCB substrate. The PCB structure 52 further includes a portion 56 which serves to connect to the transmitter (as implemented in the signal processing unit 50).

An example of the PCB layout is shown in FIG. 6, according to which each segment 20 of the metal traces is provided at each end with a contact pad 54 for the chip inductor 22 connecting this conductor segment to the adjacent conductor segments, with 71 and 72 indicating the soldering pads of the matching circuit (shunt discrete component 18).

According to some implementations, there may be from 1 to 15 of the inductors 22, while the example of FIGS. 5 to 9 includes 9 of the inductors 22.

Figure 8:
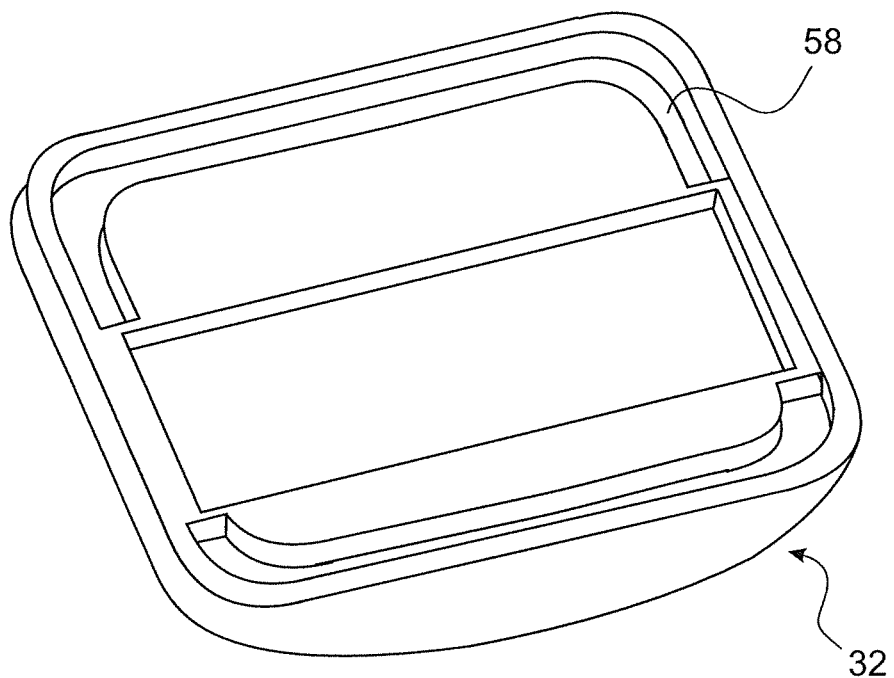
FIG. 8 is a perspective view of the faceplate of the ITE hearing instrument of FIG. 7.
Figure 9:
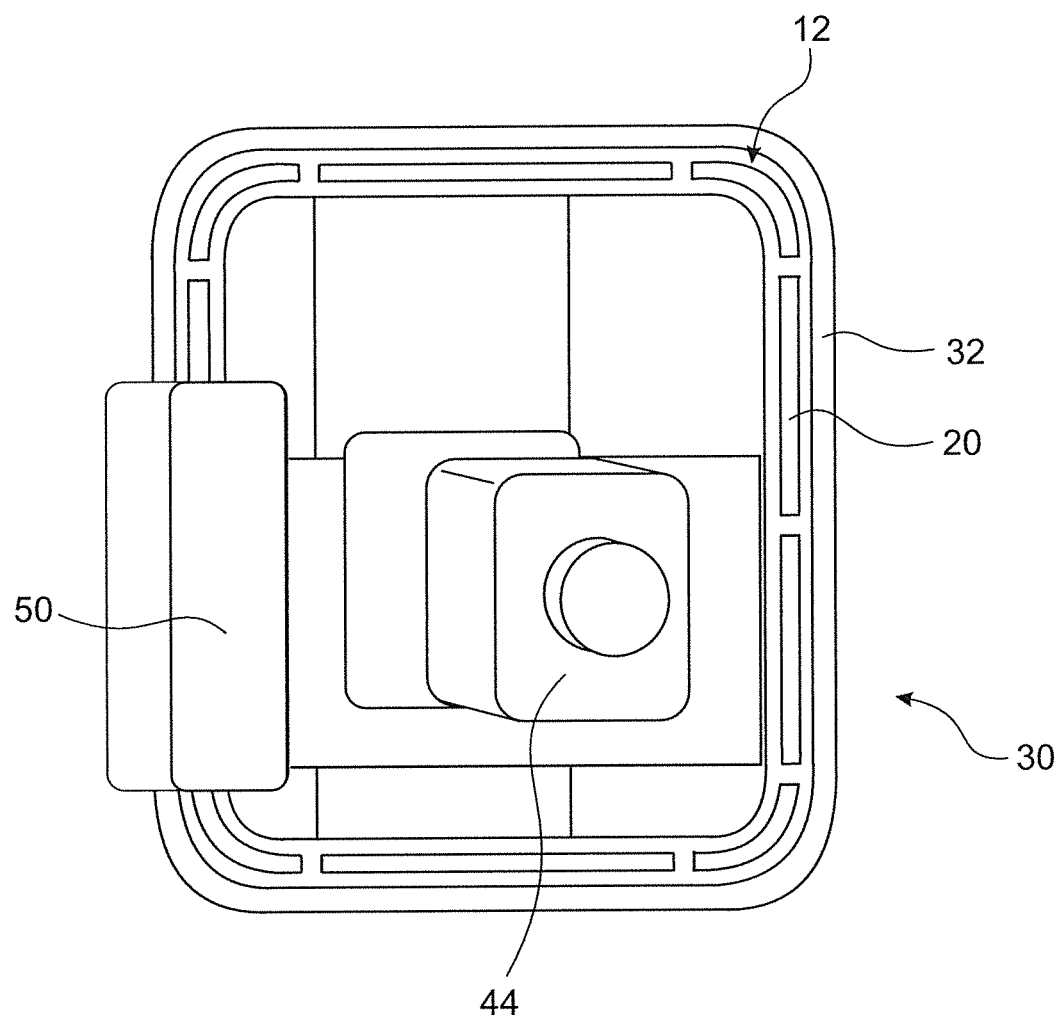
FIG. 9 is an elevated view of the ITE hearing instrument of FIG. 7 after having been assembled.

The faceplate 32 is shown in more detail in FIG. 8 and comprises a groove 58 for receiving the PCB structure 52 with the conductors 20 and the inductors 22, with the adhesive material 38 filling the grove 58 so as to fix the PCB structure 52 at the faceplate 32. In some implementations, the groove 58 may have a depth of 1.3 mm and a width of 0.5 mm to be filled by the adhesive material 38. The thickness of the part of the faceplate 32 acting as a support structure for the antenna 12 may have, in some implementations, a thickness from 1 to 3 mm. In some implementations, the faceplate may be made of a polyamide, such as a "polyamide 12" material (this material is also known as "nylon 12").

The adhesive material 38, in some implementations, may be an epoxy compound or a silicone glue. According to some implementations, the adhesive material may have a relative permittivity of at least 2.0 and a dissipation factor of less than 0.01 (as measured at the operating frequencies of the transmitter). The shape of the adhesive material 38 is determined by the groove 58 of the faceplate 32, so that, in the example of FIG. 9, the thickness of the frame formed by the adhesive material 38 is 1.3 mm, and the width is 0.5 mm. In some implementations, the adhesive material may have a thickness of at least 0.8 mm and can encapsulate the antenna all around.

The hard frame 40, in some implementations, may have a relative permittivity of at least 10, a dissipation factor of less than 0.002 (as measured at the operating frequency of the transmitter) and a thickness of a least 0.3 mm An example of a suitable material is available under the designation "PREPERM" from the company Premix Oy, Finland.

It is to be noted that herein the "width" of the frame type structures 38, 40 and 52 designates the dimension in the axial direction in FIG. 7.

In the example of FIGS. 5 to 9, the faceplate 32, the adhesive material 38 and the hard frame together serve to increase the relative permittivity around the PCB structure 52 with the conductors 20, so as to increase the electrical length of the antenna 12, in addition to the contribution provided by the inductors 22.

Figure 10:
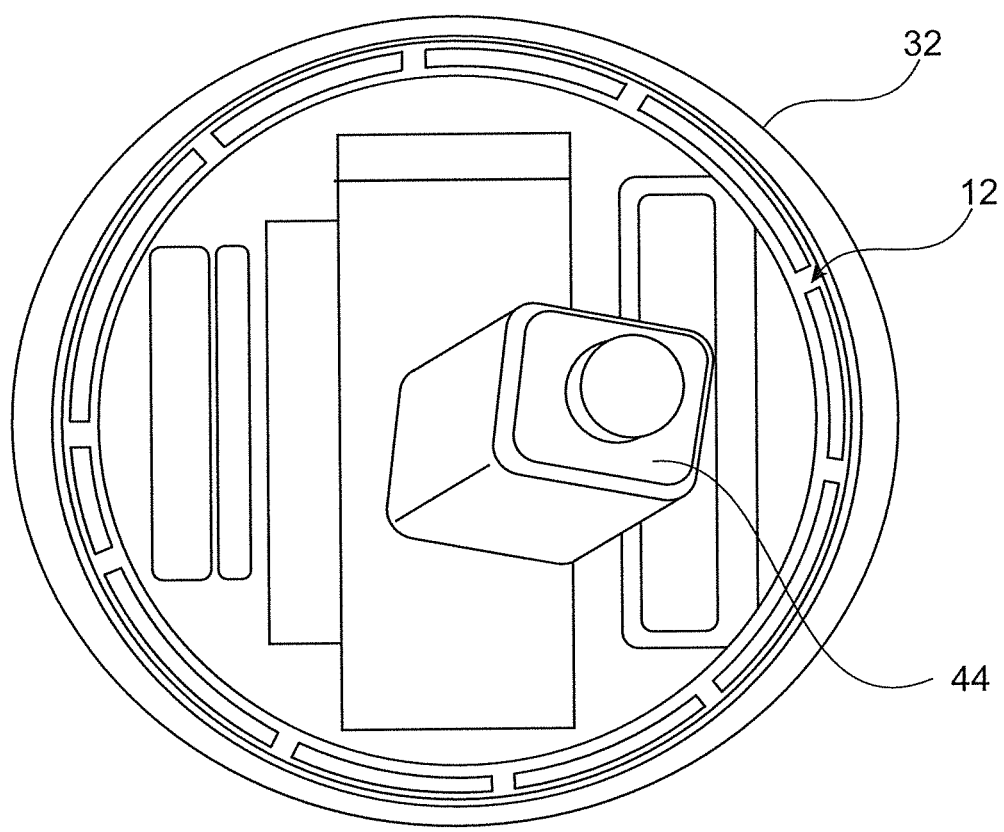
FIG. 10 is an example of an ITE hearing instrument including a circular full-wave loop antenna.

While FIGS. 5 to 9 relate to an example of an antenna having a rectangular shape, an example with an antenna having a circular shape is shown in FIG. 10, which shows an elevated view onto an ITE hearing instrument comprising a circular antenna 12.

It is also to be noted that in some implementations the conductors 20 could be meandered.

Figure 2:
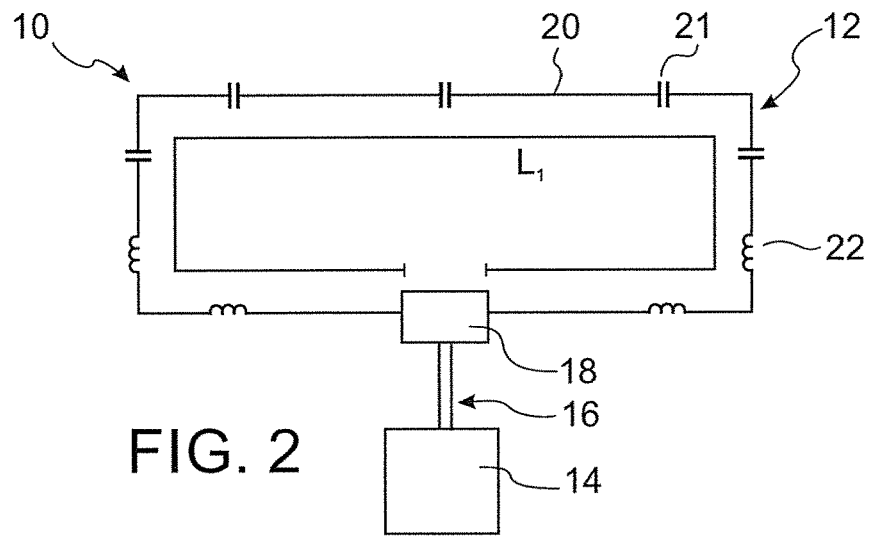
FIG. 2 is a block diagram of an example of a half-wave loop antenna connected to a transmitter

An alternative implementation of a loop antenna is shown in FIG. 2, wherein the electrical length is not close to the guided wavelength, as in the implementations discussed so far, but rather is close to half of the guided wavelength (from 0.45 to 0.55 times the guided wavelength). This achieved by a combination of inductive and capacitive tuning. To this end, a plurality of inductors 22 and a plurality of capacitors 21 are provided, which are connected in series with the conductors 20 in such a manner that part of the conductors 20 is connected in series by one of the inductors 22, as in the previously discussed implementations, and part of the conductors 20 is connected in series by one of the capacitors 21. Apart from such "replacement" of some of the inductors 22 by capacitors 21, the half-wave loop antenna of FIG. 2 may be physically very similar to the previously discussed implementations of the full-wave loop antenna, such as with regard to the conductors 20, the physical length, the high permittivity frame structure, the matching circuit 18, etc.

As illustrated in FIG. 3C, the current distribution is equivalent to a half-sinusoidal period, with approximately coincident nulls being distant by at least 160 degrees, preferably 180 degrees, from the feeding point 71, 72. The current distribution does not change sign over all the loop length. Capacitive tuning by the capacitors 21 serves to place the high-impedance point (correspondent to current equal to zero) far from the feeding point, so as to allow matching of the antenna impedance to the impedance suitable for a radio transceiver. This can be achieved by placing the capacitors in the part of the antenna which is most distant from the feed point, as shown in FIG. 2. Inductive tuning by the inductors 22 serves to electrically lengthen the antenna to a half-wavelength. The radiation pattern of such half-wave antenna in free-space is less directive than for a full-wave antenna (it is more similar to a potato-shape). The physical length of the half-wave antenna is not more than 35% of the wavelength in vacuum.

The phrases "in some implementations," "according to some implementations," "in the implementations shown," "in other implementations," and generally mean the particular feature, structure, or characteristic following the phrase is included in at least one implementation of the disclosure, and may be included in more than one implementation. In addition, such phrases do not necessarily refer to the same embodiments or different implementations.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

What is claimed is:

1. A transmission system for a body-worn electronic device, comprising a loop antenna (12) and a transmitter (50), wherein the overall physical length of the loop antenna is less than 75% of the vacuum wavelength of a lower limit frequency of an operating frequency range of the transmitter, while the electrical length of the antenna is from 0.9 to 1.1 times the guided wavelength of the lower limit frequency of the operating frequency range of the transmitter, and wherein the loop antenna comprises a plurality of conductors (20) which are connected in series by inductors (22) so as to increase the electrical length of the loop antenna.

2. The system of claim 1, wherein the physical length of the loop antenna (12) is less than 50% the vacuum wavelength at the lower limit of the operating frequency range of the transmitter (50).

3. The system of claim 2, wherein the physical length of the loop antenna (12) is less than 35% of the vacuum wavelength at the lower limit of the operating frequency range the transmitter (50).

4. A transmission system for a body-worn electronic device, comprising a loop antenna (12) and a transmitter (50), wherein the overall physical length of the loop antenna is less than 35% of the vacuum wavelength at the lower limit of an operating frequency range of the transmitter, while the electrical length of the antenna is from 0.45 to 0.55 times of the guided wavelength at the lower limit of the operating frequency range of the transmitter, and wherein the loop antenna comprises a plurality of conductors (20) which, in part, are connected in series by inductors (22) so as to increase the electrical length of the loop antenna and which, in part, are connected in series by capacitors so as to keep the maximum impedance point away from the feeding point by a distance between 160 and 180 degrees.

5. The system of claim 4, wherein the quality factor of the inductors (22) at the lower limit of the operating frequency range of the transmitter (50) is at least 50.

6. The system of claim 5, wherein the quality factor of the inductors at the lower limit of the operating frequency range of the transmitter is at least 80.

7. The system of claim 4, wherein the inductors (22) are chip inductors.

8. The system of claim 4, wherein the plurality of inductors comprises from 1 to 15 inductors (22).

9. The system of claim 4, wherein each of the inductors (22) has an inductance of 0.5 to 100 nH.

10. The system of claim 4, wherein the conductors (20) are metal traces on a flexible substrate.

11. The system of claim 10, wherein the metal comprises copper.

12. The system of claim 10, wherein the flexible substrate comprises polyimide.

13. The system of claim 10, wherein the conductors (20) and the flexible substrate form a multi-layer PCB stack-up (52).

14. The system of claim 10, wherein the traces (20) have a width of 0.05 to 0.5 mm.

15. The system of claim 10, wherein the traces (20) have a thickness of 8 to 16 μm.

16. The system of claim 4, wherein the operating frequency of the transmitter (50) is in the 2.4 GHz ISM band.

17. The system of claim 4, wherein the transmission system comprises a transmission line (16) and a matching circuit (18) for transforming the antenna impedance to the impedance of the transmission line.

18. The system of claim 17, wherein part of the matching circuit (18) is an inductor or a capacitor.

19. The system of claim 4, wherein the conductors (20) are at least partially surrounded by a frame structure of insulating surrounding material (32, 38, 40) having an average relative permittivity at the lower limit of the operating frequency range of the transmitter (50) of at least 2 so as to increase the electrical length of the loop antenna (12).

20. The system of claim 19, wherein the frame structure comprises a hard frame (40) of dielectric material covering at least one side of the conductors (20).

21. The system of claim 20, wherein the material of the hard frame (40) has a relative permittivity of at least 10 at the lower limit of the operating frequency range of the transmitter (50).

22. The system of claim 20, wherein the material of the hard frame (40) has a dissipation factor of less than 0.002 at the lower limit of the operating frequency range of the transmitter (50).

23. The system of claim 20, wherein the hard frame (40) has a thickness of at least 0.3 mm.

24. The system of claim 19, wherein the frame structure comprises an adhesive material (38) for fixing the loop antenna (12) to a support structure (32).

25. The system of claim 24, wherein the adhesive material (38) has a relative permittivity of at least 2.0 at the lower limit of the operating frequency range of the transmitter (50).

26. The system of claim 24, wherein the adhesive material (38) has a dissipation factor of less than 0.01 at the lower limit of the operating frequency range of the transmitter (50).

27. The system of claim 24, wherein the adhesive material (38) comprises an epoxy compound or silicone.

28. The system of claim 24, wherein the adhesive material (38) has a thickness of at least 0.8 mm.

29. The system of claim 19, wherein the frame structure comprises a support structure (32) at which the conductors (20) are fixed.

30. The system of claim 29, wherein the support structure is part of a faceplate (32) of the electronic device (30).

31. The system of claim 29, wherein the support structure (32) comprises a polyamide.

32. The system of claim 31, wherein the support structure (32) comprises polyamide 12.

33. The system of claim 31, wherein the thickness of the support structure (32) is from 1 to 3 mm.

34. The system of claim 19, wherein the frame structure comprises a support structure (32) for carrying the conductors (20), an adhesive material (38) for gluing the conductors to the support structure and a hard frame (40) for covering the side of the conductors facing away from the support structure.

35. The system of claim 34, wherein the support structure (32) comprises a groove (58) for receiving the conductors (20), and wherein the adhesive material (38) fills the groove.

36. An electronic device comprising a transmission system of claim 4, wherein the electronic device is an ITE, an RIC, a BTE hearing instrument or a sound processor of a cochlear implant.

* * * * *